(12) United States Patent
Choi

(10) Patent No.: US 7,946,369 B2
(45) Date of Patent: May 24, 2011

(54) STRUCTURE FOR MOUNTING RADIATOR TO FRONT-END MODULE CARRIER

(75) Inventor: Heedong Choi, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 471 days.

(21) Appl. No.: 12/115,311

(22) Filed: May 5, 2008

(65) Prior Publication Data

US 2009/0152033 A1 Jun. 18, 2009

(30) Foreign Application Priority Data

Dec. 14, 2007 (KR) .......................... 10-2007-0130877

(51) Int. Cl.
*B60K 11/04* (2006.01)
(52) U.S. Cl. ...................................... 180/68.4; 180/68.6
(58) Field of Classification Search .................. 180/68.4, 180/68.6
See application file for complete search history.

(56) References Cited

U.S. PATENT DOCUMENTS

| | | | | |
|---|---|---|---|---|
| 1,163,425 A * | 12/1915 | Lindstrom | .................... | 180/68.4 |
| 1,176,934 A * | 3/1916 | Taylor et al. | .................. | 180/68.4 |
| 3,121,467 A * | 2/1964 | Bryant | ........................... | 180/68.4 |
| 4,564,168 A * | 1/1986 | Ikuta et al. | ..................... | 248/638 |
| 4,766,968 A * | 8/1988 | Matsunaga | .................... | 180/68.4 |
| 5,785,140 A * | 7/1998 | Suzuki et al. | ................. | 180/68.4 |
| 6,513,579 B1 * | 2/2003 | Kent et al. | ........................ | 165/67 |
| 6,691,767 B2 * | 2/2004 | Southwick et al. | ............. | 165/67 |
| 6,742,615 B2 * | 6/2004 | Cristante et al. | ............. | 180/68.4 |
| 6,772,824 B1 * | 8/2004 | Tsuruta | ............................ | 165/41 |
| 2001/0001994 A1 * | 5/2001 | Enomoto et al. | ............. | 180/68.4 |
| 2001/0019098 A1 * | 9/2001 | Guyomard | ..................... | 248/562 |
| 2002/0157885 A1 * | 10/2002 | Brown | ........................... | 180/68.4 |
| 2004/0195020 A1 * | 10/2004 | Suwa et al. | .................. | 180/68.4 |
| 2006/0213639 A1 * | 9/2006 | Kobayashi et al. | ............. | 165/67 |

FOREIGN PATENT DOCUMENTS

| | | | |
|---|---|---|---|
| EP | 211253 A1 * | 2/1987 | |
| JP | 2004-142638 | 5/2004 | |
| JP | 2005-349924 A | 12/2005 | |
| KR | 10-2004-0033480 | 4/2004 | |
| KR | 10-2005-0027546 | 3/2005 | |
| KR | 10-2007-0106973 | 3/2006 | |

* cited by examiner

*Primary Examiner* — J. Allen Shriver, II
*Assistant Examiner* — John R Olszewski
(74) *Attorney, Agent, or Firm* — Morgan, Lewis & Bockius LLP

(57) ABSTRACT

A structure for mounting a radiator to a front-end module carrier includes an insulator, a bracket body, at least one guide rib on the front-end module carrier, and a screw-fastening boss on the front-end module carrier. The bracket body defines a space for the insulator to be disposed therein. The bracket body also includes at least one guide portion, and a flange defining a fastening hole for a screw to be inserted therein. The screw is also inserted to the screw-fastening boss. The guide rib guides the guide portion during insertion of the bracket body to the front-end module carrier. The guide portion may define a vertical wall with a first, narrow end and a second, relatively wider end. The front-end module carrier may also have a boss rib connected to the screw-fastening boss.

5 Claims, 4 Drawing Sheets

# STRUCTURE FOR MOUNTING RADIATOR TO FRONT-END MODULE CARRIER

CROSS-REFERENCE TO RELATED APPLICATIONS

The present application is based on, and claims priority from, Korean Application Serial Number 10-2007-0130877, filed on Dec. 14, 2007, the disclosure of which is hereby incorporated by reference herein in its entirety.

FIELD OF THE INVENTION

The present invention relates to a structure for mounting a radiator to a front-end module carrier of a vehicle.

BACKGROUND OF THE INVENTION

A typical structure for mounting the top of a radiator to a front-end module carrier includes an insulator on an upper mounting bracket. Bracket panels protrude from both sides of the insulator and are bolted to the front-end module carrier. Because the upper mounting bracket and bracket panels are large, reinforcing ribs are usually provided.

However, it is difficult to design strong ribs because of the structural limitations. Further, it is difficult to bolt the bracket panels to the front-end module carrier without bolt guides.

The above information disclosed in this Background section is only for enhancement of understanding of the background of the invention and therefore it may contain information that does not form the prior art that is already known in this country to a person of ordinary skill in the art.

SUMMARY OF THE INVENTION

A structure for mounting a radiator to a front-end module carrier includes an insulator, a bracket body, at least one guide rib on the front-end module carrier, and a screw-fastening boss on the front-end module carrier. The bracket body defines a space for the insulator to be disposed therein. The bracket body also includes at least one guide portion, and a flange defining a fastening hole for a screw to be inserted therein. The screw is also inserted to the screw-fastening boss. The guide rib guides the guide portion during insertion of the bracket body to the front-end module carrier.

The guide portion may define a vertical wall with a first, narrow end and a second, relatively wider end.

The front-end module carrier may also have a boss rib connected to the screw-fastening boss.

BRIEF DESCRIPTION OF THE DRAWINGS

For better understanding of the nature and objects of the present invention, reference should be made to the following detailed description with the accompanying drawings, in which.

DETAILED DESCRIPTION OF THE PREFERRED EMBODIMENTS

Figure 1:
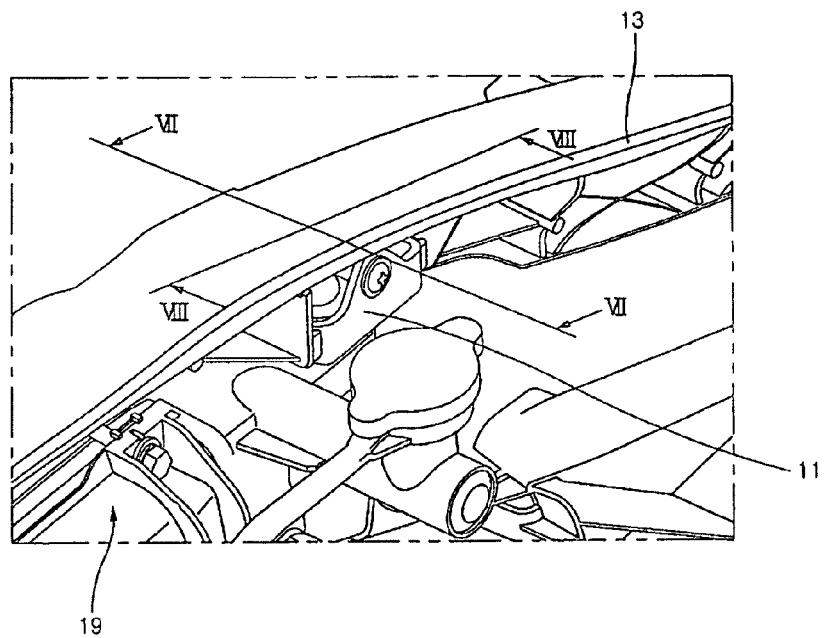
FIG. 1 is a perspective view of the structure of an upper mounting portion for mounting a radiator to a front-end module carrier according to an embodiment of the invention.
Figure 2:
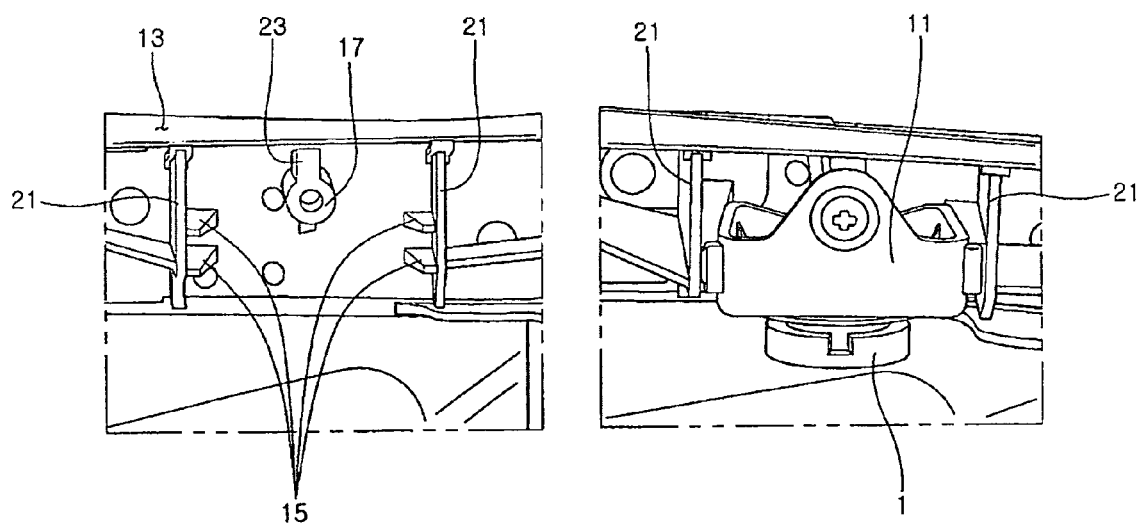
FIG. 2 is a view comparing the structures when a bracket body is inserted and not inserted in the front-end module carrier of FIG. 1.
Figure 3:
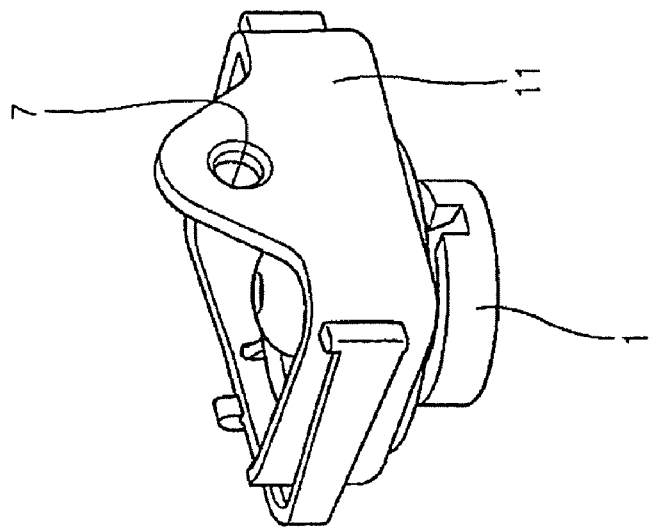
FIG. 3 is a perspective view illustrating the assembly of the bracket body with an insulator of FIG. 1.
Figure 3:
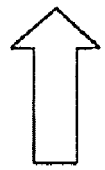
Figure 3:
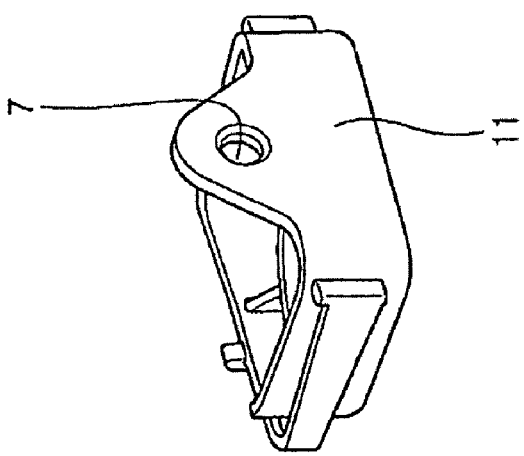
Figure 3:
Figure 3:
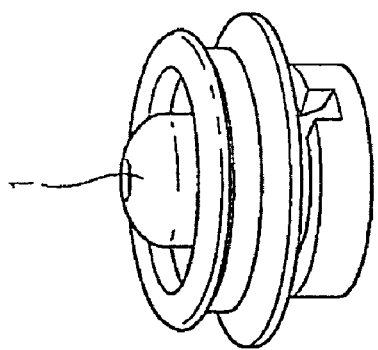

A structure for mounting a radiator 19 to a front-end module carrier 13 according to an embodiment of the invention includes: an insulator 1 and a bracket body 11. Bracket body 11 has a space therein in which insulator 1 is mounted. Bracket body 1 also has guide portions 3 at both sides, and a fastening flange 9 having a fastening hole 7 through which a screw 5 is inserted. Guide ribs 15 are provided on the front-end module carrier 13 to guide guide portions 3 of bracket body 11 during insertion of bracket body 11. A screw-fastening boss 17 is also provided on front-end module carrier 13 to guide screw 5 into fastening hole 7 of bracket body 11.

The upper portion of radiator 19 is connected to and held by insulator 1.

Figure 4:
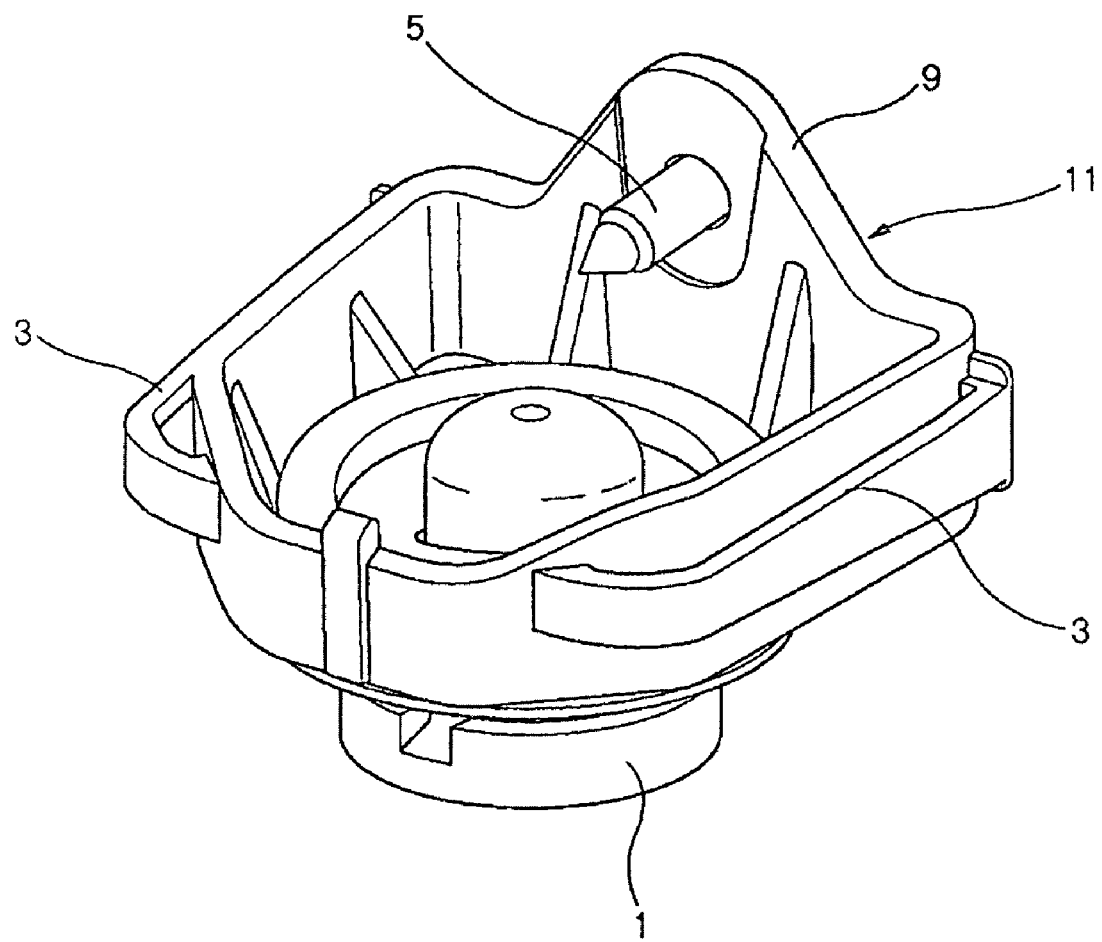
FIG. 4 is a perspective view illustrating the assembly of the bracket body with an insulator, seen from another direction.
Figure 5:
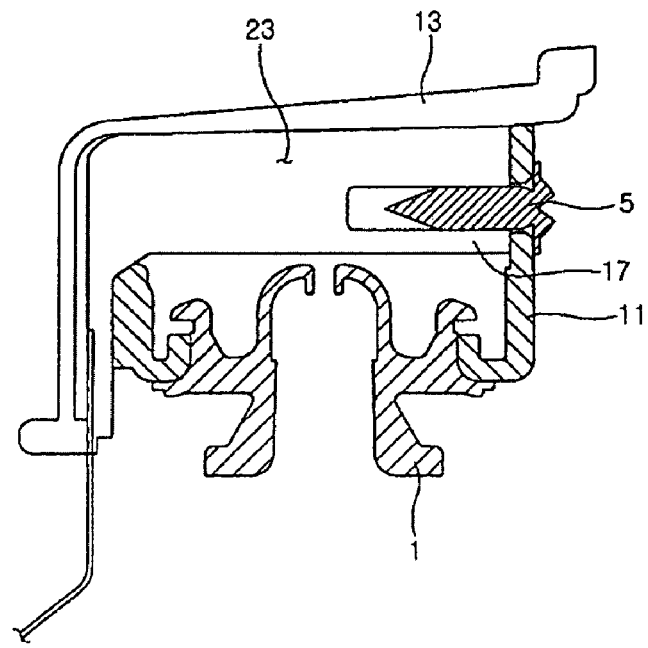
FIG. 5 is a cross-sectional view taken along the line VII-VII of FIG. 1.
Figure 6:
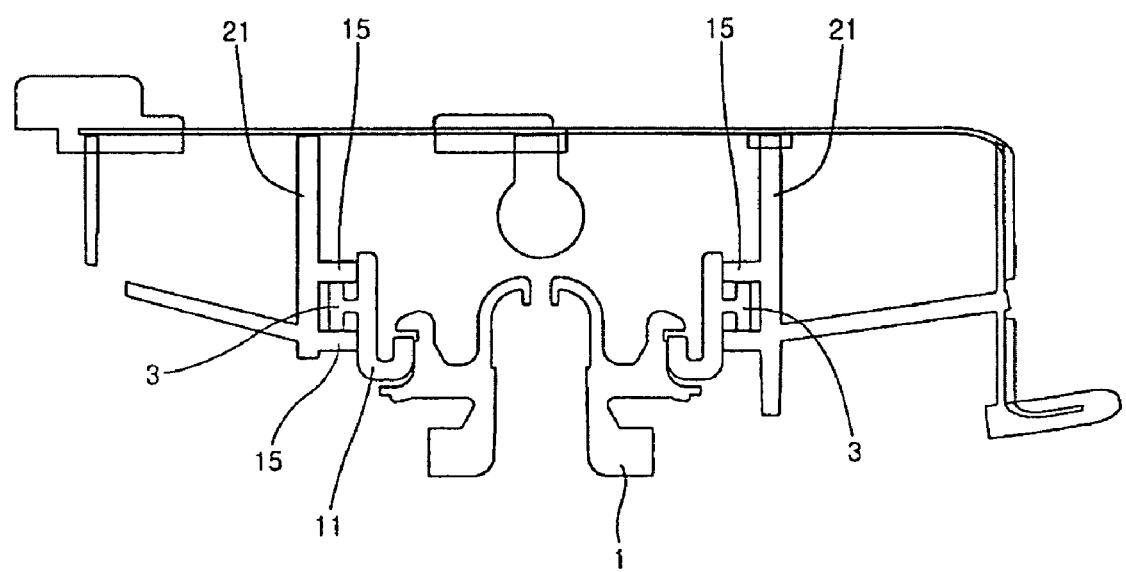
FIG. 6 is a cross-sectional view taken along the line VIII-VIII of FIG. 1.

Each guide portion 3 of bracket body 11 is a vertical wall with the front end (bottom left in FIG. 4) narrower than the rear end (top right in FIG. 4) and guide ribs 15 simultaneously guide the upper and lower sides of guide portions 3 (see FIG. 6). Further, guide ribs 15 integrally protrude from reinforcing ribs 21 that are perpendicular to front-end module carrier 13.

Therefore, when inserted into front-end module carrier 13, bracket body 11 is first easily inserted, but an appropriate force is required to completely insert bracket body 11 because guide portions 3 are pressed by guide ribs 15. Therefore, bracket body 11 is firmly held in front-end module carrier 13.

Further, reinforcing ribs 21 strengthen the front-end module carrier 13. Bracket body 11, reinforcement ribs 21, and front-end module carrier 13 make a substantially closed rectangular cross section once bracket body 11 has been inserted, further strengthening the structure.

Further, fastening flange 9 protrudes upward from bracket body 11 and screw-fastening boss 17 is reinforced by a boss rib 23 that extends down from front-end module carrier 13 and is connected to the upper portion of screw-fastening boss 17. Screw-fastening boss 17, boss rib 23, and reinforcement ribs 21 further strengthen the portion where the upper mounting bracket is mounted.

Further, since bracket body 11 is fastened to screw-fastening boss 17 by screw 5 passing through fastening hole 7, assembly is easy.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mounting apparatus for mounting a radiator to a front-end module carrier, comprising:
   an insulator;
   a bracket body defining a space configured and dimensioned for the insulator to be disposed therein, the bracket body further comprising at least one guide portion and a flange defining a fastening hole configured and dimensioned for a screw to be inserted therein;
   at least one guide rib formed on the front-end module carrier to guide the at least one guide portion during insertion of the bracket body to the front-end module carrier; and a screw-fastening boss formed on the front-end module carrier, configured and dimensioned for the screw to be inserted therein.

2. The mounting apparatus as defined in claim 1, wherein the at least one guide portion defines a substantially vertical wall comprising a first, narrow end and a second, relatively wider end.

3. The mounting apparatus as defined in claim 2, wherein the at least one guide portion is formed at a lateral side of the bracket body in a longitudinal direction thereof.

4. The mounting apparatus as defined in claim 3, wherein guide portions are disposed between guide ribs such that the guide ribs simultaneously guide upper and lower sides of the guide portions when the bracket body is mounted to the front-end module carrier.

5. The mounting apparatus as defined in claim 1, wherein the front-end module carrier further comprises a boss rib connected to the screw-fastening boss.

* * * * *